United States Patent [19]

Sillen

[11] Patent Number: 4,887,177
[45] Date of Patent: Dec. 12, 1989

[54] MAGNETIC HEAD HAVING AN ELECTRO-CHEMICALLY INERT GAP OF HARD MATERIAL

[75] Inventor: Cornelis W. M. P. Sillen, Eindhoven, Netherlands

[73] Assignee: U.S.Philips Corp., New York, N.Y.

[21] Appl. No.: 128,367

[22] Filed: Dec. 3, 1987

[30] Foreign Application Priority Data

Dec. 3, 1986 [NL] Netherlands ............... 8603078

[51] Int. Cl.$^4$ ............................................. G11B 5/235
[52] U.S. Cl. ..................................... 360/120; 360/126
[58] Field of Search ............... 360/120, 119, 125, 126; 29/603

[56] References Cited

U.S. PATENT DOCUMENTS

| 3,412,455 | 11/1968 | Bronnes et al. | 357/71 |
| 3,672,045 | 6/1972 | Robertson | 29/603 |
| 4,764,832 | 8/1988 | Eaz et al. | 360/126 |

FOREIGN PATENT DOCUMENTS

| 1221820 | 12/1984 | Japan | 29/603 |
| 1016002 | 1/1986 | Japan | 360/120 |
| 1016005 | 1/1986 | Japan | 360/120 |
| 2188009 | 8/1987 | Japan | 29/603 |

| 8303918 | 11/1983 | PCT Int'l Appl. | 360/120 |

OTHER PUBLICATIONS

IEEE Transaction on Magnetics, vol. Mag. 18, No. 6, Nov., 1982 "Metal-in-Gap Head", by F. J. Jeffers.
Journalof Magnetism materials 54–57 (1986) 1567–1570 "Recording Characteristics of High Metal Powder Floppy Disc", by H. Fujiwara.

*Primary Examiner*—Stuart N. Hecker
*Assistant Examiner*—David J. Severin
*Attorney, Agent, or Firm*—William L. Botjer

[57] ABSTRACT

Magnetic head, comprising a magnetic core provided by two core limbs (1, 3) formed a ferrite, two cladding layers (11) of a magnetic material provided on the core limbs and having a higher saturation magnetization than the ferrite, a non-magnetic gap (9) present between the cladding layers, and a winding aperture (5) accommodating an electric coil (7). The gap is composed of two insulation layers (13) of an electrically insulating material provided on the cladding layers and having a greater mechanical hardness than the other layers of the gap, two first layers (15) of a first metallic material provided on the inslation layers and two second layers (17) of a second metallic material provided on the first layers and being bonded to each other.

6 Claims, 1 Drawing Sheet

MAGNETIC HEAD HAVING AN ELECTRO-CHEMICALLY INERT GAP OF HARD MATERIAL

BACKGROUND OF THE INVENTION

The invention relates to a magnetic head for recording, reproducing and/or erasing magnetic information in a track of a magnetic information carrier. A magnetic core has two core limbs formed from a ferrite, at least one limb having a cladding layer of a magnetic material having a higher saturation magnetization than the ferrite. A non-magnetic gap is present between the core limbs and a winding aperture having an electric coil is wound around at least one of the core limbs.

A magnetic head of this type generally denoted in the literature as a MIG head (Metal-in-gap head) is known from the publication IEEE Transactions on Magnetics, Vol. Mag. 18, No. 6, November 1982, metal-in-gap record head, by F. J. Jeffers c.s..

It is generally known to use ferrites, particularly monocrystalline Mn-Zn ferrites as magnetic core materials for magnetic heads because ferrites have a number of advantages. Such advantages are a high resistance to wear, a relatively high specific resistance and satisfactory magnetic properties relating to coercive force and permeability.

Magnetic fields which are generated by a magnetic head at the area of the transducing gap in order to write information on a magnetic medium are directly dependent on the saturation magnetization of the material of the magnetic head core. Ferrites have a saturation magnetization which is sufficiently high to write information on conventional tapes such as $CrO_2$ tapes having a coercive force $H_c$ of approximately 700 Oersted. In order to record information on magnetic tapes having a high coercive force such as MP magnetic tapes based on pure Fe, conventional magnetic heads which exclusively have ferrite on either side of the transducing gap are less suitable. The magnetic fields which are generated by such magnetic heads to write information on a magnetic medium are in fact limited by the relatively low saturation magnetization of the ferrite. The strength of the writing field is therefore insufficiently high to ensure optimum writing of magnetic tapes having a high coercive force.

A stronger writing field is envisaged with the magnetic head known from the said publication. This known magnetic head has sendust cladding layers. These soft magnetic layers are present on either side of the non-magnetic gap and are provided by sputtering on the core limbs connected together by means of a glass joint. The gap is composed in a manner not further described.

It is to be noted that a cladding layer may consist of a plurality of layers provided on one another as has already been proposed in the non-prepublished Dutch patent application 8601732, to which U.S. application Ser. No. 018,686 (now abandoned) corresponds, herewith incorporated by reference.

A similar magnetic head is known from the magazine Journal of Magnetism Materials 54–57 (1986) 1567–1570 "Recording characteristics of high metal powder floppy disc" by H. Fujiwara c.s. The non-magnetic gap consists of a glass layer and two $SiO_2$-layers, which $SiO_2$-layers extend between the glass layer and the cladding layers. When this known magnetic head is manufactured, the composition of the gap is to be effected at a temperature in the range between 500° and approximately 700° C. due to the glass properties. Such a high composition temperature may, however, have several detrimental effects on the magnetic head provided with cladding layers. One of these detrimental results may be a deterioration of the magnetic properties of the soft-magnetic cladding layers. Furthermore mechanical stresses may be created in the cladding layers at high temperatures, which stresses are so high that they cause fractures in the ferrite core limbs.

SUMMARY OF THE INVENTION

It is an object of the invention to provide a magnetic head which has an electrochemically inert and magnetically sharp, non-magnetic gap with a reproducible length which can be composed at a relatively low temperature.

To this end the gap is composed of two first layers of a first metallic material provided on the core limbs, an insulation layer of an electrically insulating material being provided between the cladding layer and one of the first layers, and two second layers of a second metallic material provided on the first layers, which second layers are bonded to each other.

Such a gap can be realized at temperatures in the range between 150° and 400° C. Inadmissible deteriorations of and inadmissible stresses in the cladding layers caused by temperature influences during manufacture can then be avoided.

The insulation layer in the gap functions as an electrochemical and diffusion barrier between the soft-magnetic material, for example an alloy based on Ni, Fe or Fe, Al, Si, of the cladding layer and the metallic materials of the first and second layers so that an electrochemical interaction between the soft-magnetic material on the one hand and the metallic materials on the other hand is prevented. The gap is therefore electro-chemically inert.

The first metallic material of the first layers serves as an adhesive material between the second metallic material of the second layers and the material of the insulation layer or the ferrite of one of the core limbs. The second layers themselves constitute the actual gap bonding and are bonded to each other by means of known techniques, for example thermocompression.

The electrically insulating material of the insulation layer is preferably chosen from the group of oxides, nitrides and carbides such as $TiO_2$, $SO_3N_4$ or TiC. In one embodiment of the magnetic head according to the invention whose insulation layer consists of such a material, the insulation layer provides an essential contribution to the hardness and the resistance to wear of the gap. It has been proved by experiment that in a magnetic head provided with two cladding layers the greater part of the gap consists of the insulation layers. The remaining part of the gap consists of the first and second layers of metallic materials. It is true that these layers are mechanically softer than the insulation layer, but due to their slight thickness compared with the overall gap length the influence on the total hardness of the gap is small. Very favourable results have been achieved with an embodiment of the magnetic head according to the invention in which $SiO_2$ is used as used as an insulation layer material.

A further favourable embodiment of the magnetic head according to the invention is characterized in that the first metallic material of the first layers is chosen from the group of Mo, Ti, Cr and NiCr. These first metallic materials are preferably combined with a second metallic material of the second layers chosen from the metals Au and Ag.

It is to be noted that it is known per se to use metal layers for bonding ferrite core limbs to each other. In this connection reference is made to U.S. Pat. No. 3,412,455 describing a method of bonding two ferrite bodies to each other by providing on each of the bodies a layer of a metal selected from the group consisting of Mo, W, Mn, Fe, Co, Ni and alloys thereof by means of cathode sputtering, whereafter successively a layer of Pt and a layer of Au are provided on this layer, whereafter the gold layers are melted together.

A magnetic head obtained in this known manner has a gap which is exclusively composed of a plurality of metal layers. A general drawback thereof is that such a gap, as compared with a gap consisting of glass and $SiO_2$ layers, is mechanically soft so that the magnetic head is easily hollowed out. A magnetic head of the type described in the opening paragraph obtained by means of the above-mentioned known method, that is to say, having at least one cladding layer provided on the ferrite would also have the specific drawback of a possible electro-chemical interaction occurring between the soft-magnetic material of the cladding layers and the metal provided thereon so that corrosion of the gap and/or the cladding layer may occur. Another disadvantage of a gap consisting of only metal layers may be the occurrence of a diffusion between the cladding layers and the gap layers, resulting in a gap which is not magnetically sharp and which has not a very reproducible length. The known method is therefore unsuitable for manufacturing magnetic heads which have one or more cladding layers.

For the sake of completeness it is to be noted that a magnetic head having two ferrite core limbs is known from U.S. Pat. No. 3,672,045 in which the core limbs are joined to each other by means of layers of Cu, Au, Ag or Ti which are connected together by means of diffusion. A layer of a material having a low magnetic permeability selected from the group of Mo, W, silicon nitride Al, Ta, Cu, Au, tantalum nitride, SiO, Ag, glass and metal-ceramic material combinations is provided between the connection layers and the ferrite core limbs. It is sure that a number of usable combinations of layers for joining the two core limbs to each other has been proposed in the above-cited patent, but none of these combinations is applicable if one or both core limbs are provided with a cladding layer of a magnetic material having a higher saturation magnetization then the ferrite. None of the said combinations is in fact capable of ensuring a satisfactory adhesion of such core limbs on the one hand and of preventing an electro-chemical interaction between the cladding layer and the metals of the gap on the other hand.

DETAILED DESCRIPTION OF THE PREFERRED EMBODIMENT

Figure 1:
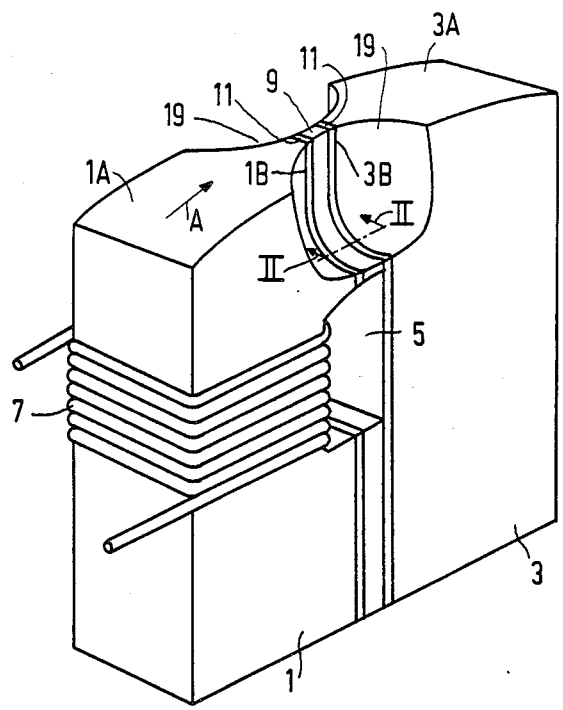
FIG. 1 is a diagrammatic perspective of an embodiment of the magnetic head according to the invention.
Figure 2:
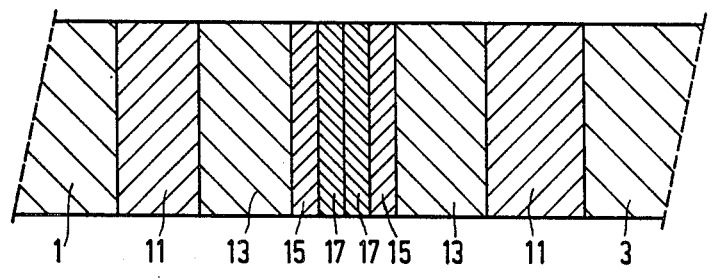
FIG. 2 is a larger cross-section, not to scale, taken on the line II—II of FIG. 1.

The magnetic head according to the invention, shown in the Figure, is suitable for writing and reading magnetic tapes having high coercive forces and comprises a magnetic core consisting of two core limbs 1 and 3 in which a winding aperture 5 is provided. A coil 7 passing through the winding aperture 5 is wound around one of the core limbs. The core limbs 1 and 3 which are formed from a ferrite, for example a monocrystalline Mn-Zn ferrite, have contact surfaces 1A and 3A, respectively, on which a magnetic tape (not shown) is moved in the direction of the arrow A during operation of the magnetic head. A non-magnetic gap 9 extending as far as the contact surfaces 1A and 3A is present between the core limbs 1 and 3. The core limbs 1 and 3 each have core faces 1B and 3B, respectively, facing the gap 9 on which faces a cladding layer 11 is provided which consists of one or more materials having a higher saturation magnetization than the ferrite. Suitable materials are, for example Ni-Fe, based alloys such as $Ni_{80}Fe_{20}$, Fe-Si-Al-based alloys such as $Fe_{85.8}Si_{9.2}Al_{5.0}$, amorphous alloys and combinations of the said alloys. In this embodiment the cladding layers 11 consist of $Ni_{80}Fe_{20}$, provided by sputtering.

The gap 9 is composed of a number of layers of a non-magnetic material which together bond the core limbs 1 and 3 to each other. In this embodiment an insulation layer 13 of $SiO_2$ of the layers of the gap 9 is provided on each of the cladding layers 11. A first layer 15 of Mo is provided on each of the insulation layers 13 by means of sputtering and a second layer 17 of Au is provided on each of the first layers 15. The first layers 15 ensure the adhesion of the second layers 17 to the insulation layers 13, whilst the second layers 17 are bonded to each other by means of thermocompression.

In a practical embodiment of the example described the layer thickness of each insulation layer 13 was 0.09 μm and the layer thickness of each first and second layers 15 and 17 was 0.03 μm. The thickness of the cladding layers 11 was 1.15 μm.

In the embodiment shown the gap 9, viewed widthwise, is perpendicular to the direction of propagation of the magnetic tape. Embodiments in which the gap in the direction considered is not oriented perpendicularly to the said direction of propagation are of course also possible. It is to be noted that the core faces 1B and 3B of the magnetic head are bounded by recesses 19 on either side of the magnetic head. The recesses 19 define the width of the gap 9 and partly extend into the tape contact face constituted by the contact surfaces 1A and 3A and partly into the side faces of the magnetic head.

Embodiments which are different from the embodiment shown are of course also possible within the scope of the invention.

What is claimed is:

1. A magnetic head for recording, reproducing and-/or erasing magnetic information in a track of a magnetic information carrier, comprising a magnetic core having two core limbs formed from a ferrite, at least one of which has a cladding layer of a magnetic material having a higher saturation magnetization than the ferrite, a non-magnetic gap present between the core limbs, and a winding aperture having an electric coil wound around at least one of the core limbs, characterized in that the gap is composed of the following layers: two first layers of a first metallic material provided on the core limbs, an insulation layer of an electrically insulating material being provided between the cladding layer and one of the first layers, and two second layers of a second metallic material provided on the first layers, which second layers are bonded to each other.

2. A magnetic head as claimed in claim 1, characterized in that the electrically insulating material of the insulation layer is chosen from the group of oxides, nitrides and carbides.

3. A magnetic head as claimed in claim 1, characterized in that the electrically insulating material of the insulation layer is $SiO_2$.

4. A magnetic head as claimed in claim 1, characterized in that the first material of the first layers is chosen from the group of Mo, Ti, Cr and NiCr.

5. A magnetic head as claimed in claim 1, characterized in that the second metalllic material of the second layers is chosen from the metals Au and Ag.

6. A magnetic head as claimed in claim 1, characterized in that the second layers are bonded to each other by means of thermo-compression.

* * * * *